United States Patent [19]

Donovan

[11] 4,165,925

[45] Aug. 28, 1979

[54] SPECTACLES AND KIT FOR MAKING SAME

[76] Inventor: LeRoy B. Donovan, Box 633, Lake Arrowhead, Calif. 92352

[21] Appl. No.: 779,809

[22] Filed: Mar. 18, 1977

[51] Int. Cl.$^2$ ............................ G02C 1/00; G02C 5/14
[52] U.S. Cl. ...................................... 351/87; 351/123; 351/131; 351/132; 351/136; 351/138; 351/139
[58] Field of Search ............... 351/123, 132, 139, 136, 351/78, 79, 80, 88, 131, 138, 122, 137, 87, 76, 71, 77, 81

[56] References Cited

U.S. PATENT DOCUMENTS

| | | | |
|---|---|---|---|
| 335,277 | 2/1886 | Freeman | 351/71 |
| 2,331,666 | 10/1943 | Dunkelsberg | 351/136 X |
| 3,155,982 | 11/1964 | Baratelli | 351/123 X |
| 3,186,001 | 5/1965 | Roeder | 351/138 |
| 3,361,514 | 1/1968 | Davis | 351/123 X |
| 4,070,104 | 1/1978 | Rice | 351/132 X |

FOREIGN PATENT DOCUMENTS

| | | | |
|---|---|---|---|
| 1295891 | 5/1962 | France | 351/123 |
| 647864 | 12/1950 | United Kingdom | 351/123 |

OTHER PUBLICATIONS

The Optometric Weekly, vol. 54, No. 32, p. 1536, Aug. 8, 1963 (advertisement).

*Primary Examiner*—Paul A. Sacher
*Attorney, Agent, or Firm*—Dana E. Keech

[57] ABSTRACT

Narrow edged widely spaced gripping ridges molded in thin flexible plastic sheets are easily and permanently applied by pressure adhesive to smooth spectacle frame gripping faces which normally directly engage nose bridge and temporal head areas thereby retaining spectacles in place during violent exercise.

6 Claims, 5 Drawing Figures

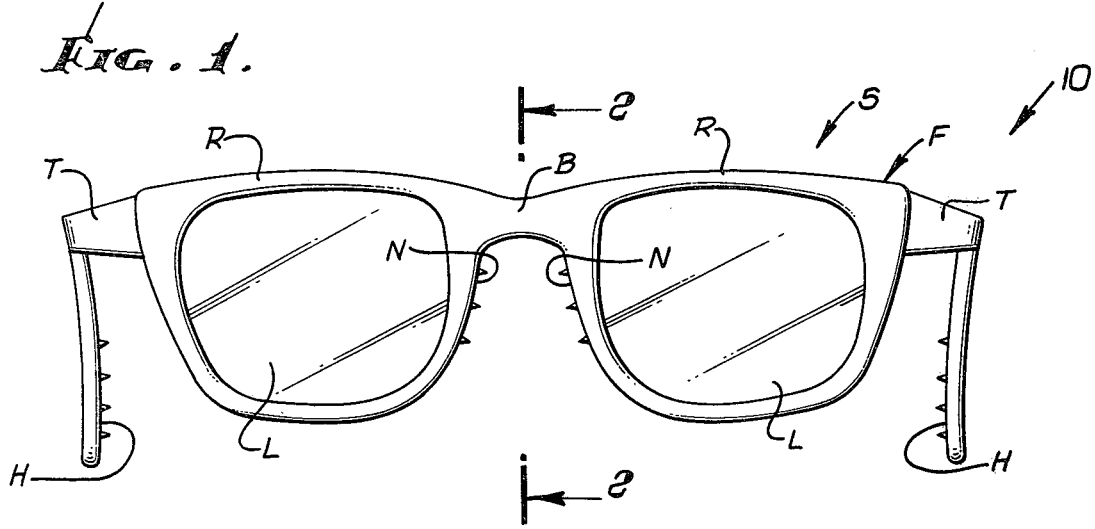
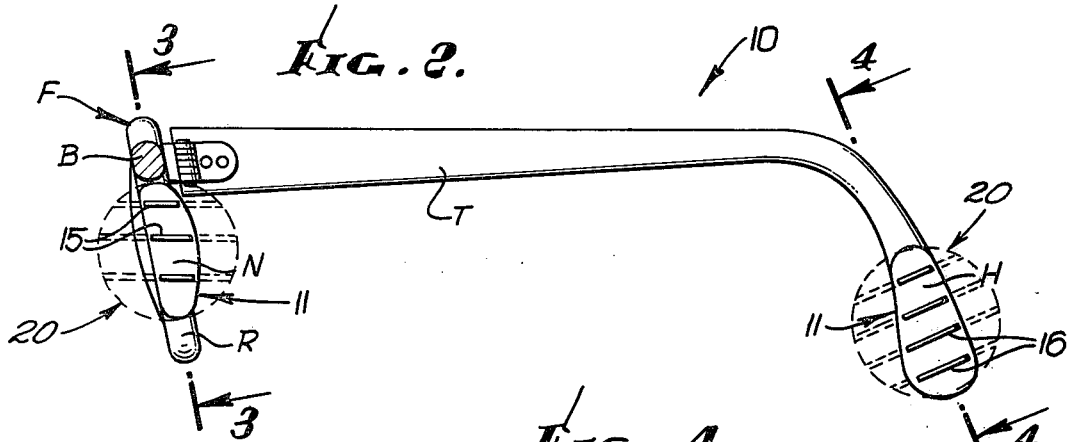
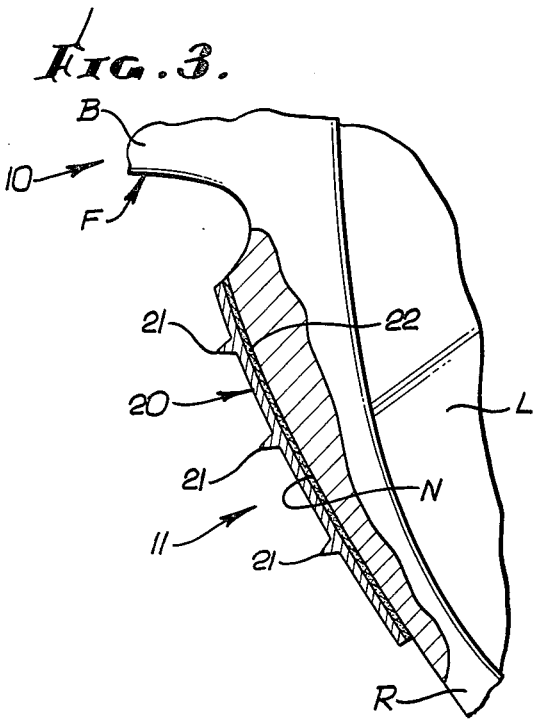
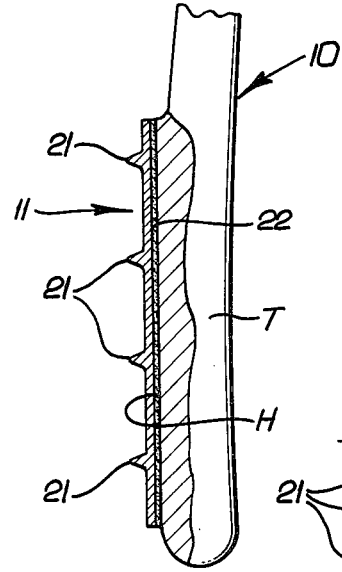
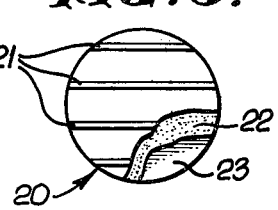

SPECTACLES AND KIT FOR MAKING SAME

SUMMARY OF THE INVENTION

The prior art is replete with efforts to secure persons against loss of spectacles when exercising vigorously in work or sports. These have included knurling pressure pads or providing them with foam rubber as well as numerous other expedients most of which have either been ineffective for the intended purpose or have constituted a source of irritation barring continuous use.

It is therefore an object of the present invention to provide a spectacle retaining device which will not only be dependable during normal hard working and playing conditions but which will allow for ventilation of the head areas contacted by the spectacles, thereby avoiding excessive perspiration and irritation developing in said areas.

Another object of the invention is to develop the traction required to retain the spectacles in place by applying pressure to the head areas engaged by the spectacles in thin straight lines fairly widely spaced.

A yet further object is to enhance the stability of spectacles worn during a high degree of physical activity by arranging the spaced frictional lines of contact with the bridge of the nose at a substantial angle relative to similar spaced lines of contact with the temporal head region.

Still another object is to arrange said frictional lines of contact with the nose bridge horizontally to resist said spectacles sliding downwardly when applied to the nose bridge in the desired transverse plane while arranging the frictional lines of contact with the temporal head region in a manner to prevent dislodgement of the spectacle bows from locking engagement with the ears of the wearer, thereby restraining said spectacles from shifting forwardly from said transverse plane, and thus slipping off of the nose bridge.

Yet another object of the invention is to provide a do-it-yourself kit enabling the purchaser thereof to convert his own spectacles so as to embody the present invention.

BRIEF DESCRIPTION OF THE DRAWINGS

FIG. 1 is a front view of a widely used style of spectacles which has been modified by application thereto of the kit of my invention so as to cause it to constitute a preferred embodiment of the spectacles of said invention.

FIG. 2 is a cross sectional view taken on the line 2—2 of FIG. 1.

FIG. 3 is an enlarged fragmentary sectional detail view taken on the line 3—3 of FIG. 2.

FIG. 4 is an enlarged fragmentary sectional detail view taken on the line 4—4 of FIG. 2.

FIG. 5 is a plan view of a flexible plastic disc molded to provide a series of pressure contact ridges, said disc having a pressure adhesive back coating normally covered by a neutral non-adhesive layer (similarly to a decal) a suitable number of said discs being included in the kit of my invention.

DETAILED DESCRIPTION OF THE PREFERRED EMBODIMENT

The invention preferably embodies a pair of spectacles 10 and a kit 11 to enable the purchaser to convert his own spectacles into the substantial equivalent of the spectacles 10.

The invention may be incorporated with any of a wide variety of spectacles and by different methods of manufacture. Only one widely used type of all-plastic-frame spectacles is shown in the drawings to illustrate one preferred method of manufacture: to wit: the method involving use of the kit 11.

This type of spectacles (before its conversion into spectacles 10 of the invention) is identified by the reference character S and may be described as follows:

A frame F includes two lens rims R in which two lenses L are framed. Frame F also includes a bridge B connecting the rims R. Slightly curved converging nose engaging surfaces N are provided on lens rims R.

A pair of molded plastic temples (or bows) T are hingedly connected to upper outer corners of lens frame F and are spring biased inwardly against the head where they turn downwardly, thereby hooking over the ears, so as to pressurally apply flat pressure surfaces H against temporal areas of the head.

The problem encountered by persons wearing the spectacles S is that vigorous activity engaged in by the wearer results in the temples T slipping upwardly out of hooking relation with the ears thereby releasing the frame F to slide forwardly from its perch on the nose bridge and causing the spectacles S to become lost, at a moment when the owner is not free to recover the same.

The invention comprehends solving this problem by providing each of the smooth, curved, converging nose gripping surfaces N, and each of the flat head-gripping surfaces H with a series of parallel narrow-edged plastic gripping ridges 15 and 16 respectively, these being spaced apart uniformly by a distance in the order of ⅛ to ¼ of an inch and having an altitude in the order of 1/32 to 1/16 of an inch. Furthermore, said ridges 15, which are provided on surfaces N, are preferably arranged horizontally and the ridges 16, provided on temple gripping surfaces H, are preferably arranged to incline down and forwardly as shown in FIG. 2.

The ridges 15 and 16 may be die formed concurrently with the manufacture of the spectacles S. The kit 11 however is provided to facilitate conversion of spectacles S into spectacles 10 of the invention in the following manner:

Referring to FIGS. 3, 4 and 5, the kit 11 includes four circular thin flexible plastic patches 20 having parallel ridges 21 molded in one face thereof within the dimension limitations above noted for ridges 15 and 16.

A thin pressure-adhesive coating 22 covers the reverse face of each of the patches 20 and this in turn is temporarily covered by a neutral sheet of paper 23.

Each of the patches 20 is applied to one of the gripping surfaces of the spectacles S by first peeling the neutral paper 23 from the back of that patch, centralizing the patch over that gripping surface, rotating the patch to position the ridges 21 thereon parallel with the chart indicated direction for the ridges 15 or 16 to be provided on said surface, pressing said patch onto said surface to permanently mount said patch on said surface, and clipping from said patch the excess peripheral portion thereof not overlying said surface.

It is thus to be noted that as gripping surfaces N and H are approximately equal in length, and that the diameter of each patch 20 exceeds that length, the ridges 21 can be positioned before applying and trimming each patch to a gripping surface so that the ridges 15 or 16 produced upon said surface by said ridges 21 will be properly oriented with the longitudinal axis of said surface as indicated by broken lines and reference character 20 in FIG. 2 of the drawings.

I claim:

1. In a kit for modifying a pair of spectacles to increase their capacity to adhere to the wearer and wherein said spectacles (S) already embody a frame (F) including two rims (R) in which two lenses are framed, a bridge (B) connecting said rims to form oval upwardly converging nose engaging areas (N), a pair of temples (T) hinged rearwardly from said frame ends to extend over the ears and inwardly to press oval areas (H) against temporal portions of the head, said kit comprising:

four like circular patches of thin flexible molded sheet plastic, the diameter of said patches permitting each of said oval spectacle pressure areas (N) and (H) to fit lengthwide neatly diametrically within and crosswise of any one of said patches;

multiple, sharply narrow edged, parallel, shallow, widely spaced ridges formed integrally on the upper face of each of said patches;

a thin coating of pressure adhesive covering the bottom of each patch; and a neutral temporary non-adherent paper back covering said pressure adhesive coating on each patch, each patch being optionally adapted to overlie any one of said spectacle pressure areas and be rotated to properly orient its ridges relative to said area for marking the outline of the latter on said patch for trimming the borders of said patch prior to removing said paper backing and sticking the trimmed and oriented patch to its area.

2. A pair of spectacles comprising:

a pair of eye lenses;

a plastic frame including a pair of rims within which said lenses are mounted and bridging said rims in co-planar spaced relation to present downwardly diverging nose engaging surfaces N which unite to support said frame in a given transverse plane 3—3 with said frame resting high on the wearer's nose with said surfaces N conforming substantially to said nose;

a pair of temples extending rearwardly from hinged connections on vertical axes with outer extremities of said frame, said temples overlying and engaging the wearer's ears and having their rear extremities resiliently biased inwardly to press substantial vertical inner surfaces H against the temporal areas of the head in a second transverse plane 4—4;

means forming a series of thin, vertically widely spaced, parallel, substantially horizontal, sharply narrow-edged plastic ridges united with said rims within the boundaries of said nose engaging surfaces N, said ridges effectively resisting said frame slipping from the position in which it is supported on said nose so long as said frame is restrained from shifting forwardly out of said given transverse plane; and plastic ridge forming means united with said temples, within the boundaries of said temporal head area engaging surfaces, to produce vertically widely spaced and downwardly inclined shallow thin edged ridges so as to snugly restrain said spectacle frame from accidentally shifting forwardly out of said given transverse plane, clear air ventilating spaces being formed between said ridges in both said transverse planes measuring one-sixteenth inch by one-fourth inch, said spaces freely ventilating the ridge supporting nose and head skin areas.

3. A pair of spectacles as recited in claim 2 wherein the series of horizontal plastic ridges united with said rims within each of the boundaries of said nose engaging surfaces N comprise three such ridges.

4. A pair of spectacles as recited in claim 3 wherein the ridges formed on each of said temples within the temporal head area engaging surface of said temple comprises four such ridges.

5. In a kit for modifying a pair of spectacles S to increase their capacity to adhere to the wearer and wherein said spectacles S already embody a frame F including two rims R in which two lenses L are framed, a bridge B connecting said rims to form oval upwardly converging nose engaging areas N, a pair of temples T hinged rearwardly from said frame ends to extend over the ears and inwardly to press oval areas H against temporal portions of the head, said kit comprising:

four like circular patches of thin flexible molded sheet plastic material, the uniform diameters of said patches permitting each of said oval spectacle pressure areas N and H to fit neatly lengthwise diametrically within the limits of any one of said patches;

the outward turned surface of each of said patches having co-extensively integrally formed therein and extending thereabove a parallel series of narrow-edged uniformly widely spaced plastic gripping ridges;

a thin coating of pressure adhesive covering the bottom surface of each patch and itself being underlaid by a neutral temporary non-adherent paper layer, each patch being optionally manipulative to overlie any one of said spectacle pressure areas as aforesaid, and, by rotational adjustment, to properly orient its ridges relative to said particular area prior to marking the outline of said area on said patch preparatory for trimming the thus marked borders of said patch, removing the neutral underlay and adhesively sticking the patch in neat pre-oriented overlapping relation on its particular spectacle pressure area.

6. A kit as defined in claim 5 wherein the plastic ridges formed integrally upon the outward turned surfaces of said patches extend approximately to an altitude of 1/16 inch outward from said surfaces and form hard sharp edges uniformly spaced apart approximately ¼ inch.

* * * * *